(12) United States Patent
Ohwatari et al.

(10) Patent No.: US 8,254,476 B2
(45) Date of Patent: Aug. 28, 2012

(54) WIRELESS COMMUNICATION DEVICE AND WIRELESS COMMUNICATION METHOD

(75) Inventors: Yusuke Ohwatari, Yokohama (JP); Takahiro Asai, Yokosuka (JP); Satoshi Suyama, Tokyo (JP); Hiroshi Suzuki, Tokyo (JP); Kazuhiko Fukawa, Tokyo (JP)

(73) Assignees: NTT DoCoMo, Inc., Tokyo (JP); Tokyo Institute of Technology, Tokyo (JP)

( * ) Notice: Subject to any disclaimer, the term of this patent is extended or adjusted under 35 U.S.C. 154(b) by 658 days.

(21) Appl. No.: 12/368,540

(22) Filed: Feb. 10, 2009

(65) Prior Publication Data

US 2009/0207931 A1 Aug. 20, 2009

(30) Foreign Application Priority Data

Feb. 15, 2008 (JP) ................................. 2008-034935

(51) Int. Cl.
*H04K 1/10* (2006.01)
(52) U.S. Cl. ....................................................... 375/260
(58) Field of Classification Search .................. 375/144, 375/260, 267, 377
See application file for complete search history.

(56) References Cited

U.S. PATENT DOCUMENTS

| | | | | |
|---|---|---|---|---|
| 2006/0045193 | A1* | 3/2006 | Stolpman et al. | 375/260 |
| 2007/0104283 | A1* | 5/2007 | Han et al. | 375/260 |
| 2007/0133659 | A1* | 6/2007 | Deng et al. | 375/144 |
| 2007/0188381 | A1* | 8/2007 | Bocquet et al. | 342/377 |

FOREIGN PATENT DOCUMENTS

| | | |
|---|---|---|
| JP | 2006-295681 | 10/2006 |
| JP | 2007-110664 | 4/2007 |
| JP | 2007-110718 | 4/2007 |
| JP | 2007-513554 | 5/2007 |
| JP | 2007-181199 | 7/2007 |
| JP | 2007-195129 | 8/2007 |
| JP | 2007-228029 | 9/2007 |
| JP | 2008-228306 | 9/2008 |

OTHER PUBLICATIONS

Satoshi Suyama, et al., "Subcarrier phase hopping MIMO-OFDM transmission employing enhanced selected mapping for PAPR reduction", Annual IEEE International Symposium on Personal Indoor Mobile Radio Communications (PIMRC), Sep. 2006, 5 pages.
Partial European Search Report issued Dec. 30, 2010, in Patent Application No. 09152756.4.

(Continued)

*Primary Examiner* — Leon-Viet Nguyen
(74) *Attorney, Agent, or Firm* — Oblon, Spivak, McClelland, Maier & Neustadt, L.L.P.

(57) ABSTRACT

A wireless communication device that transmits a wireless signal by carrying out linear precoding processing using a plurality of transmission antennas is provided with: a phase pattern control unit for selecting a phase pattern that reduces peak-to-average power ratio; a phase rotation unit for carrying out phase rotation on a modulation signal using the phase pattern selected in the phase pattern control unit; a control signal generation unit for generating a control signal based on the phase pattern selected in the phase pattern control unit; and a preceding unit for carrying out linear precoding processing on output signals from the phase rotation unit and output signals from the control signal generation unit.

10 Claims, 9 Drawing Sheets

OTHER PUBLICATIONS

Zhiqiang Liu, et al, "Linear Constellation Precoding for OFDM With Maximum Multipath Diversity and Coding Gains", IEEE Transactions on Communications, vol. 51, No. 3, XP 011071162, Mar. 2003, pp. 416-427.

L. Yi, et al., "Interpolation-based precoding with limited feedback for MIMO-OFDM systems", IET Communications, vol. 1, No. 4, XP 6029250, Aug. 2, 2007, pp. 679-683.

Extended Search Report issued Mar. 23, 2011, in Application No. Patent No. 09152756.4-1237 / 2091198.

Zhengdao Wang, et al., "Where Fourier Meets Shannon", "Wireless Multicarrier Communications", IEEE Signal Processing Magazine, vol. 17, No. 3, XP011089863, May 1, 2000, pp. 29-48.

Japanese Office Action dated Mar. 27, 2012 issued in Japanese Patent Application No. 2008-034935 filed Feb. 15, 2008 (with English-language translation).

\* cited by examiner

WIRELESS COMMUNICATION DEVICE AND WIRELESS COMMUNICATION METHOD

BACKGROUND OF THE INVENTION

1. Field of the Invention

A present invention relates to a wireless communication device and a wireless communication method in an MIMO transmission system using linear precoding.

2. Related Background Art

High-speed, highly reliable MIMO-OFDM transmission systems are attracting attention in mobile communications. OFDM signals are composed of a large number of subcarriers, and although they have properties suitable for frequency-selective phasing, they have a problem of a large peak-to-average power ratio (PAPR). In addition, in the case of carrying out code multiplexing and transmitting a plurality of signal series after spreading in a CDMA system as well, there is a problem of the PAPR becoming excessively large. Moreover, in addition to OFDM and CDMA systems, in the case of using a single carrier system and the like, in the case of carrying out MIMO transmission using a plurality of transmission antennas, there is a problem of the PAPR becoming excessively large when the number of signal streams to be parallel multiplexed increases.

In this manner, in the case of transmission signal waveforms having a large PAPR, together with transmission characteristics deteriorating due to occurrence of nonlinear distortion in a transmission power amplifier, there is also occurrence of out-band emission power. When a larger input backoff is used for the transmission power amplifier in order to avoid this, transmission power efficiency decreases considerably. Consequently, subcarrier phase hopping-selected mapping (SPH-SLM) that is capable of realizing both improvement of transmission characteristics in MIMO-OFDM and reduction of PAPR is described in a document (S. Suyama, N. Nomura, H. Suzuki, and K. Fukawa, "Subcarrier phase hopping MIMO-OFDM transmission employing enhanced selected mapping for PAPR reduction," Annual IEEE Inter. Symposium on Personal Indoor Mobile Radio Communication. (PIMRC), pp. 1-5, September 2006; hereinafter called "Document 1"). In the method described in the Document 1, PAPR is able to be reduced by selecting a phase pattern that results in maximum peak suppression from random phase matrix candidates in the form of a plurality of unitary matrices that cause phase rotation of a modulation signal of each subcarrier.

However, in the case of applying this method for multiplying a random phase matrix of the related background art described above to an MIMO transmission system using linear preceding such as MIMO eigenmode transmission, there was a problem of being unable to obtain effects of linear precoding. In other words, there was a problem of the characteristics of beams formed by multiplying transmission antenna weight by each transmission signal stream in the form of linear precoding processing being deteriorated by applying the related background art described above. For example, in a case of using MIMO eigenmode transmission for linear precoding processing, although a plurality of formed beams have a characteristic of being orthogonal, in a case of applying the above-mentioned related background art in the form of a method for multiplying a random phase matrix to this MIMO eigenmode transmission, the formed orthogonal beams end up deteriorating.

SUMMARY OF THE INVENTION

An object of the present invention is to provide a wireless communication device and wireless communication method capable of reducing PAPR by phase rotation while retaining effects of linear precoding in an MIMO transmission system using linear precoding such as MIMO eigenmode transmission.

In order to solve the above-mentioned problems, the wireless communication device as claimed in the present invention is a wireless communication device that transmits a wireless signal by carrying out linear precoding processing using a plurality of transmission antennas, and the wireless communication device is provided with: a phase pattern control unit for selecting a phase pattern that reduces peak-to-average power ratio, a phase rotation unit for carrying out phase rotation on a modulation signal using the phase pattern selected by the phase pattern control unit, a control signal generation unit for generating a control signal using the phase pattern selected by the phase pattern control unit, and a precoding unit for carrying out linear precoding processing on output signals from the phase rotation unit and output signals from the control signal generation unit.

As a result of employing the configuration described above, the phase rotation unit is able to retain effects of linear precoding by carrying out preceding after having imparted phase rotation to a transmission signal. In addition, the phase pattern control unit reduces PAPR by selecting an optimum phase pattern based on the peak value of PAPR among a plurality of phase pattern candidates.

In addition, the wireless communication device as claimed in the present invention is further provided with an MIMO-OFDM modulation unit and MIMO-OFDM transmission unit, and the wireless communication device is preferably configured so that a signal of each subcarrier generated by the MIMO-OFDM modulation unit is input to the phase rotation unit and the phase pattern control unit, and the output from the preceding unit is input to the MIMO-OFDM transmission unit. Namely, precoding processing is carried out after phase rotation has been carried out on a signal of each subcarrier following modulation in an MIMO-OFDM system. As a result, PAPR can be reduced while retaining effects of linear precoding in an MIMO-OFDM system.

In addition, the wireless communication device as claimed in the present invention is further provided with an MIMO-CDMA modulation unit and an MIMO-CDMA transmission unit, and the wireless communication device is preferably configured so that a spread signal generated by using each spreading code by the MIMO-CDMA modulation unit is input to the phase rotation unit and the phase pattern control unit, and the output from the precoding unit is input to the MIMO-CDMA transmission unit. Namely, precoding is carried out after having carried out phase rotation on signals spread with each spreading code in an MIMO-CDMA system. As a result, PAPR can be reduced while retaining effects of linear precoding in an MIMO-CDMA system.

In addition, the wireless communication device as claimed in the present invention is further provided with a single carrier MIMO modulation unit, and the wireless communication device is preferably configured so that a signal of each transmission stream generated in order to carry out parallel transmission in the single carrier MIMO modulation unit is input to the phase rotation unit and the phase pattern control unit. Namely, precoding processing is carried out after having carried out phase rotation on a modulation signal in a single carrier MIMO system. As a result, PAPR can be reduced while retaining effects of linear preceding in a single carrier MIMO system.

In addition, the wireless communication device for MIMO-OFDM transmission as claimed in the present invention is further provided with a block control unit, an inverse Fourier transformation unit and a parallel-serial conversion unit, and the wireless communication device is preferably configured so that the output from the precoding unit is input to the block control unit, a signal divided into a plurality of blocks by the block control unit is input to the inverse Fourier transformation unit, the output from the Fourier transformation unit is input to the parallel-serial conversion unit, the output from the parallel-serial conversion unit is input to the phase rotation unit and the phase pattern control unit, and the phase pattern control unit selects a phase pattern by using a time signal waveform that is output from the parallel-serial conversion unit. As a result, PAPR can be reduced while retaining effects of linear precoding in an MIMO-OFDM system while also reducing the load of operations in the phase pattern control unit.

In order to solve the above-mentioned problems, the wireless communication method as claimed in the present invention is a wireless communication method for transmitting a wireless signal by carrying out linear precoding processing using a plurality of transmission antennas, the wireless communication method includes: a phase pattern control step of selecting a phase pattern that reduces peak-to-average power ratio, a phase rotation step of carrying out phase rotation on a modulation signal using the phase pattern selected in the phase pattern control step, a control signal generation step of generating a control signal using the phase pattern selected in the phase pattern control step, and a precoding step of carrying out linear precoding processing on output signals from the phase rotation step and output signals from the control signal generation step.

As a result of employing the configuration described above, the phase rotation step makes it possible to retain effects of linear precoding by carrying out precoding after having imparted phase rotation to a transmission signal. In addition, the phase pattern control step makes it possible to reduce PAPR by selecting an optimum phase pattern based on the peak value of PAPR among a plurality of phase pattern candidates.

In addition, the wireless communication method as claimed in the present invention further includes an MIMO-OFDM modulation step and an MIMO-OFDM transmission step, and the wireless communication method is preferably configured so that a signal of each subcarrier generated in the MIMO-OFDM modulation step is input to the phase rotation step and the phase pattern control step, and the output from the precoding step is input to the MIMO-OFDM transmission step. Namely, precoding processing is carried out after phase rotation has been carried out on a signal of each subcarrier following modulation in an MIMO-OFDM system. As a result, PAPR can be reduced while retaining effects of linear precoding in an MIMO-OFDM system.

In addition, the wireless communication method as claimed in the present invention further includes an MIMO-CDMA modulation step and an MIMO-CDMA transmission step, and the wireless communication method is preferably configured so that a spread signal generated by using each spreading code in the MIMO-CDMA modulation step is input to the phase rotation step and the phase pattern control step, and the output from the precoding step is input to the MIMO-CDMA transmission step. Namely, precoding processing is carried out after having carried out phase rotation on signals spread with each spreading code in an MIMO-CDMA system. As a result, PAPR can be reduced while retaining effects of linear precoding in an MIMO-CDMA system.

In addition, the wireless communication method as claimed in the present invention further includes a single carrier MIMO modulation step, and the wireless communication method is preferably configured so that a signal of each transmission stream generated in order to carry out parallel transmission in the single carrier MIMO modulation step is input to the phase rotation step and the phase pattern control step. Namely, precoding processing is carried out after having carried out phase rotation on a modulated signal in a single carrier MIMO system. As a result, PAPR can be reduced while retaining effects of linear precoding in a single carrier MIMO system.

In addition, the wireless communication method for MIMO-OFDM transmission as claimed in the present invention further includes a block control step, an inverse Fourier transformation step and a parallel-serial conversion step, and the wireless communication method is preferably configured so that the output from the precoding step is input to the block control step, a signal divided into a plurality of blocks in the block control step is input to the inverse Fourier transformation step, the output from the Fourier transformation step is input to the parallel-serial conversion step, the output from the parallel-serial conversion step is input to the phase rotation step and the phase pattern control step, and in the phase pattern control step, a phase pattern is selected by using a time signal waveform that is output from the parallel-serial conversion step. As a result, PAPR can be reduced while retaining effects of linear precoding in an MIMO-OFDM system while also reducing the load of operations in the phase pattern control step.

According to the wireless communication device and wireless communication method as claimed in the present invention, PAPR can be reduced by phase rotation while retaining effects of linear precoding in an MIMO transmission system using linear precoding such as MIMO eigenmode transmission.

DESCRIPTION OF THE PREFERRED EMBODIMENTS

The following provides an explanation of a wireless communication device in embodiments of the present invention with reference to the drawings.

[First Embodiment]

Figure 1:
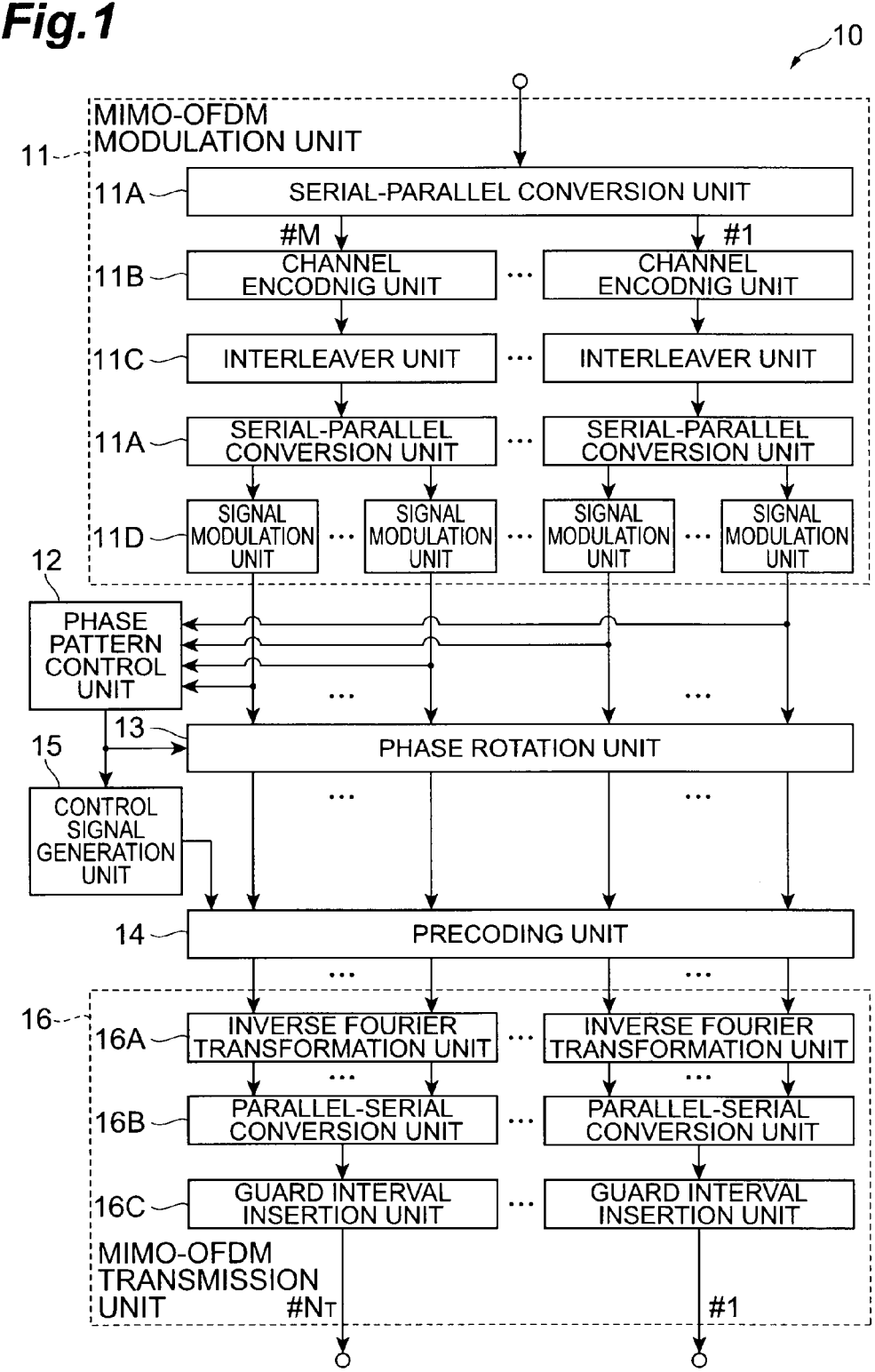
FIG. 1 is a configuration diagram of a wireless communication device of an MIMO-OFDM transmission system in a first embodiment.

First, a configuration of a wireless communication device for an MIMO-OFDM transmission system in a first embodiment of the present invention is explained. FIG. 1 is a hardware configuration diagram of the present wireless communication device 10 for an MIMO-OFDM transmission system. As shown in FIG. 1, the wireless communication device 10 physically includes an MIMO-OFDM modulation unit 11, a phase pattern control unit 12, a phase rotation unit 13, a precoding unit 14, a control signal generation unit 15 and an MIMO-OFDM transmission unit 16. Here, the MIMO-OFDM modulation unit 11 includes a serial-parallel conversion unit 11A, a channel encoding unit 11B, an interleaver unit 11C and a signal modulation unit 11D, while the MIMO-OFDM transmission unit 16 includes an inverse Fourier transformation unit 16A, a parallel-serial conversion unit 16B and a guard interval insertion unit 16C.

Figure 2:
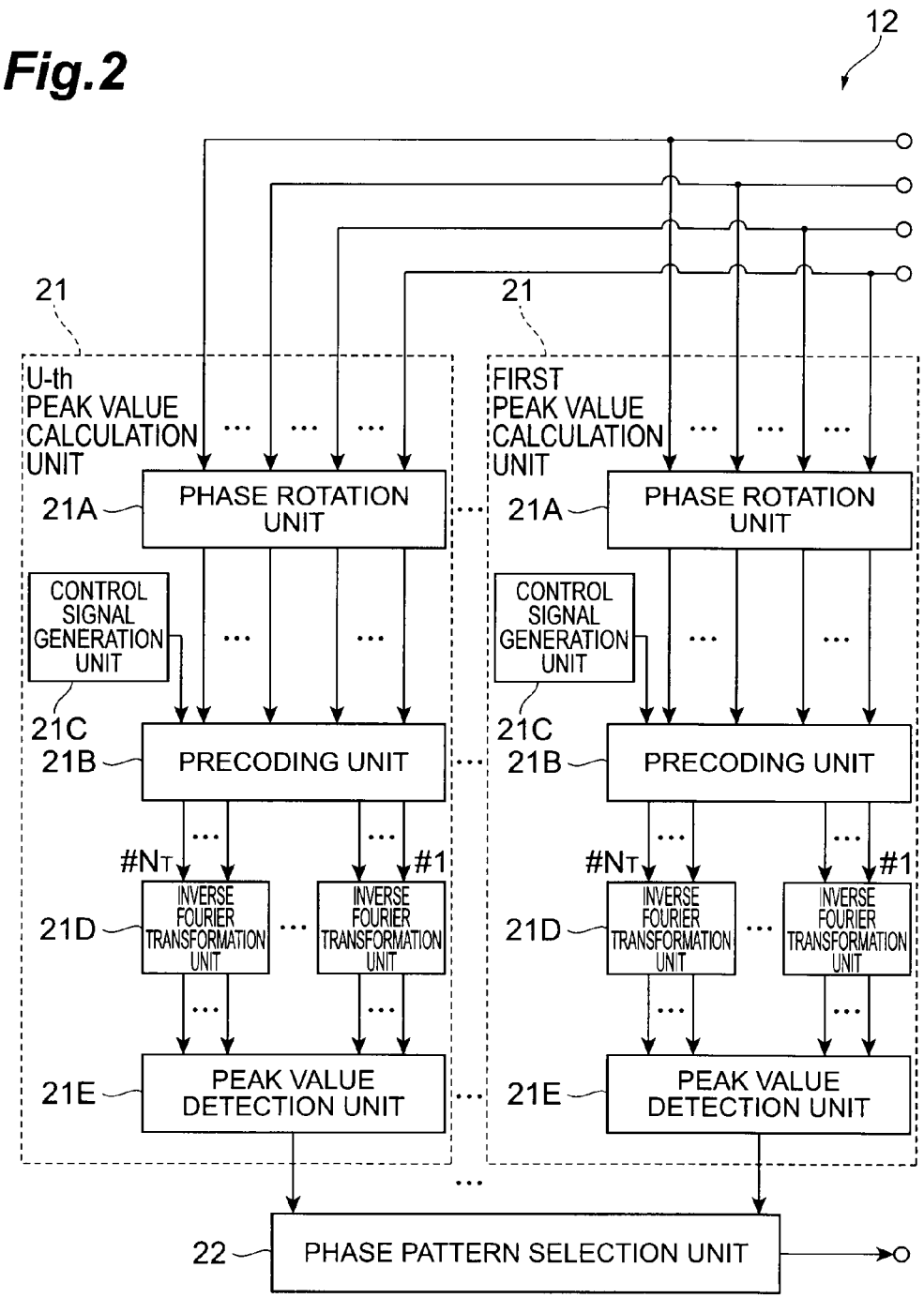
FIG. 2 is a configuration diagram of a phase pattern control unit of a wireless communication device of an MIMO-OFDM transmission system in a first embodiment.

FIG. 2 shows a configuration diagram of the phase pattern control unit 12 for an MIMO-OFDM transmission system in the present embodiment. The phase pattern control unit 12 includes a phase pattern selection unit 22 and U pieces of peak value calculation units 21 ("U" is the number of phase pattern candidates). The peak value calculation unit 21 corresponding to each phase pattern includes a phase rotation unit 21A, a preceding unit 21B, a control signal generation unit 21C, an inverse Fourier transformation unit 21D and a peak value detection unit 21E.

Continuing, an operation of the wireless communication device 10 and a wireless communication method in the present embodiment is explained. The following provides an explanation for a case of using eigenmode transmission for the linear precoding processing in an MIMO-OFDM transmission system using N number of subcarriers, $N_T$ number of transmission antennas, NR number of receiving antennas and M number of transmission signal streams to be spatially multiplexed ($M \leq N_T$).

To begin with, in the MIMO-OFDM modulation unit 11 shown in FIG. 1, the serial-parallel conversion unit 11A assigns a data signal series to be transmitted to each transmission stream to be multiplexed, the channel encoding unit 11B carries out channel encoding, the interleaver unit 11C carries out interleaving, the serial-parallel conversion unit 11A assigns a data after the interleaving to each subcarrier, and the signal modulation unit 11D carries out modulation to generate a transmission signal $z_n$. Here, $z_n$ represents a transmission signal in an n-th subcarrier ($0 \leq n \leq N-1$), and the following provides a description for this n-th ($0 \leq n \leq N-1$) subcarrier.

After having generated transmission signal $z_n$ in the signal modulation unit 11D, a matrix $Q_{\hat{u},n}$ for carrying out phase rotation is multiplied by the transmission signal $z_n$ in the phase rotation unit 13 followed by multiplying by a unitary matrix $V_n$ in the preceding unit 14 to generate a transmission signal vector $s_{\hat{u},n}$ corresponding to the $\hat{u}$-th phase pattern. Here, the matrix $Q_{\hat{u},n}$ for carrying out phase rotation represents a matrix in the $\hat{u}$-th ($1 \leq \hat{u} \leq U$) phase pattern selected in the phase pattern control unit 12 to be described later. In addition, the unitary matrix $V_n$ is a matrix obtained by singular value decomposition (SVD) of a channel matrix $H_n$ of $N_T \times N_R$ MIMO channels represented by the following formula (1), and can be represented in the form of the following formula (2).

$$H_n = \begin{pmatrix} H_{11,n} & H_{12,n} & \cdots & H_{1N_T,n} \\ H_{21,n} & H_{22,n} & \cdots & H_{2N_T,n} \\ \vdots & \vdots & \ddots & \vdots \\ H_{N_R1,n} & H_{N_R2,n} & \cdots & H_{N_RN_T,n} \end{pmatrix} \quad (1)$$

$$H_n = U_n D_n V_n^H \quad (2)$$

Here, $H$ represents a complex conjugate transposition, and matrix $D_n$ can be represented by the following formula (3).

$$D_n = \begin{pmatrix} \sqrt{\lambda_{1,n}} & 0 & \cdots & 0 \\ 0 & \sqrt{\lambda_{2,n}} & \cdots & 0 \\ \vdots & \vdots & \ddots & \vdots \\ 0 & 0 & \cdots & \sqrt{\lambda_{N_T,n}} \end{pmatrix} \quad (3)$$

Furthermore, $\lambda_{n_T,n}$ is the $n_T$-th eigenvalue of $H_n^H H_n$, and $\lambda_{1,n} > \lambda_{2,n} > \ldots > \lambda_{N_T,n}$.

The transmission signal vector $s_{\hat{u},n}$ generated in the precoding unit 14 can be represented by the following formula (4) using the above-mentioned unitary matrix $V_n$ and the matrix $Q_{\hat{u},n}$ for carrying out phase rotation.

$$s_{\hat{u},n} = (s_{\hat{u},1,n}\, s_{\hat{u},2,n} \cdots s_{\hat{u},N_T,n})^T = V_n Q_{\hat{u},n} z_n \quad (4)$$

Here, $T$ represents a transposition, and each element in the generated transmission signal vector $s_{\hat{u},n}$ is input to the inverse Fourier transformation unit 16A in the corresponding transmission antenna.

On the other hand, in the control signal generation unit 15, a control signal is generated for notifying a receiving side of phase pattern data $\hat{u}$ selected in the phase pattern control unit 12, and the generated control signal is input to the precoding unit 14. In the precoding unit 14, precoding processing is carried out on the control signal by multiplying the control signal by a unitary matrix obtained by carrying out the singular value decomposition indicated in the formula (2) using a channel matrix of the subcarrier transmitting the control signal.

In the inverse Fourier transformation unit 16A, a time-domain signal is generated by carrying out inverse Fourier transformation on the precoded signal transmission vector $s_{\hat{u},n}$ and control signal input from the preceding unit 14, and then input to the parallel-serial conversion unit 16B. The parallel-serial conversion unit 16B converts a signal series that is input in parallel to a serial signal series and inputs the serial signal series to the guard interval insertion unit 16C. In the guard interval insertion unit 16C, a guard interval is inserted into the input signal to generate a transmission signal in each antenna.

Continuing, an operation of the phase pattern control unit 12 shown in FIG. 2 is explained. In the phase pattern control unit 12 including the phase pattern selection unit 22 and U pieces of peak value calculation units 21 ("U" is the number of phase pattern candidates), phase rotation is carried out by multiplying an input transmission signal $z_n$ by a matrix $Q_{u,n}$ defined by the following formula in the phase rotation unit 21A in the peak value calculation unit 21 corresponding to the u-th ($1 \leq u \leq U$) phase pattern.

$$Q_{u,n} = \begin{pmatrix} e^{j\phi_{u,1,n}} & 0 & \cdots & 0 \\ 0 & e^{j\phi_{u,2,n}} & \cdots & 0 \\ \vdots & \vdots & \ddots & \vdots \\ 0 & 0 & \cdots & e^{j\phi_{u,N_T,n}} \end{pmatrix} \quad (5)$$

Subsequently, a signal output from the phase rotation unit 21A is input to the precoding unit 21B, and precoding processing is carried out by multiplying by a unitary matrix $V_n$ in the preceding unit 21B. At this time, the transmission signal vector $s_{u,n}$ corresponding to the u-th phase pattern after preceding becomes as indicated below.

$$s_{u,n} = (s_{u,1,n} \, s_{u,2,n} \cdots s_{u,N_T,n})^T = V_n Q_{u,n} z_n \quad (6)$$

Each element of transmission signal vector $s_{u,n}$ generated in the precoding unit 21B is input to the inverse Fourier transformation unit 21D in each corresponding transmission antenna. In addition, a control signal corresponding to the u-th phase pattern is generated in the control signal generation unit 21C, and the generated control signal is input to the precoding unit 21B. In the precoding unit 21B, precoding processing is carried out on the control signal by multiplying the control signal by a unitary matrix obtained by carrying out singular value decomposition using a channel matrix in the subcarrier that transmits the control signal.

In the inverse Fourier transformation unit 21D, a time signal waveform is generated by carrying out inverse Fourier transformation on the precoded transmission signal vector $s_{u,n}$ and control signal input from the preceding unit 21B. The time signal waveform output from the inverse Fourier transformation unit 21D corresponding to each transmission antenna is input to the peak value detection unit 21E. In the peak value detection unit 21E, the peak value being the largest value is output from the time signal waveform of each transmission antenna. The maximum peak value output from the peak value detection unit 21E in each peak value calculation unit 21 is input to the phase pattern section unit 22, and the phase pattern that enables the maximum peak value to be reduced the most is selected in the phase pattern selection unit 22. Here, if the selected phase pattern is assumed to be $\hat{u}$, then $\hat{u}$ is selected according to the formula indicated below.

$$\hat{u} = \underset{u}{\arg\min}\left[\underset{k,n_t}{\max} |s_{u,n_t}(k)|^2\right] \quad (7)$$

Here, $s_{u,n_t}(k)$ represents the time signal waveform for the $n_t$-th antenna to which phase pattern u has been applied and the k-th ($0 \leq k \leq N-1$) sample. The selected phase pattern $\hat{u}$ is output from the phase pattern selection unit 22 and input to the phase rotation unit 13 and the control signal generation unit 15 shown in FIG. 1.

Continuing, an action and effects of the wireless communication device 10 in the present embodiment is explained. In the wireless communication device 10 in the present embodiment, PAPR is able to be reduced by rotating the phase of each subcarrier using the $\hat{u}$-th phase pattern selected according to the formula (7). In addition, as a result of carrying out phase rotation prior to the precoding unit 14, channels can be made to be orthogonal by multiplying a unitary matrix $U^H$ by a reception signal vector $r_n$ on the receiving side in the same manner as conventional eigenbeam transmission. Here, the $N_R$-dimensional reception signal vector $r_n$ is represented by the formula (8) indicated below.

$$r_n = H_n s_n + n_n \quad (8)$$

Here, $n_n$ is an NR-dimensional noise vector. When unitary matrix $U^H$ is multiplied by this reception signal vector $r_n$ on the receiving side, the multiplied reception signal vector $\tilde{r}_n$ can be represented by the formula indicated below by using the relationship of formula (2).

$$\tilde{r}_n = U_n^H r_n = U_n^H H_n s_{\hat{u},n} + \tilde{n}_n = U_n^H H_n V_n Q_{\hat{u},n} z_n + \tilde{n}_n = D_n Q_{\hat{u},n} z_n + \tilde{n}_n \quad (9)$$

$$\tilde{n}_n = U_n^H n_n \quad (10)$$

Here, channel orthogonality is maintained since matrices $D_n$ and $Q_{\hat{u},n}$ in formula (9) are diagonal matrices. In other words, in order to reduce PAPR, the transmission signal vector $s_{\hat{u},n}$ subjected to phase rotation by matrix $Q_{\hat{u},n}$ is able to retain effects of linear preceding based on multiplication by unitary matrix $V_n$. Furthermore, on the receiving side, the original data signal can be detected by carrying out phase rotation in a direction opposite to the phase rotation by matrix $Q_{\hat{u},n}$ on reception signal vector $\tilde{r}_n$, by using phase pattern data $\hat{u}$ notified by a control signal.

Here, when phase rotation different for each antenna is carried out after precoding in conventional eigenmode transmission, the orthogonal beam formed by preceding is disrupted resulting in deterioration of transmission characteristics. In contrast, in the phase pattern control unit 12 of the present invention, phase rotation is carried out on a transmission signal $z_n$ prior to carrying out precoding and precoding is carried out subsequent thereto. As a result, since phase rotation can be carried out on the transmission signal without having to perform any special procedures on the signal after preceding, PAPR can be reduced while maintaining the orthogonal beam formed by preceding.

Furthermore, although an example of applying the present invention in the present embodiment to MIMO-OFDM transmission has been described above, the present invention can also be applied to any systems based on OFDM, such as Multi Carrier (MC)-CDMA or OFDMA. In other words, the present invention can be applied in cases in which MIMO transmission is carried out using linear preceding processing in a method based on OFDM, such as MC-CDMA in which spread signals are transmitted using an OFDM subcarrier, or OFDMA in which an OFDM subcarrier is assigned to multiple users.

Figure 3:
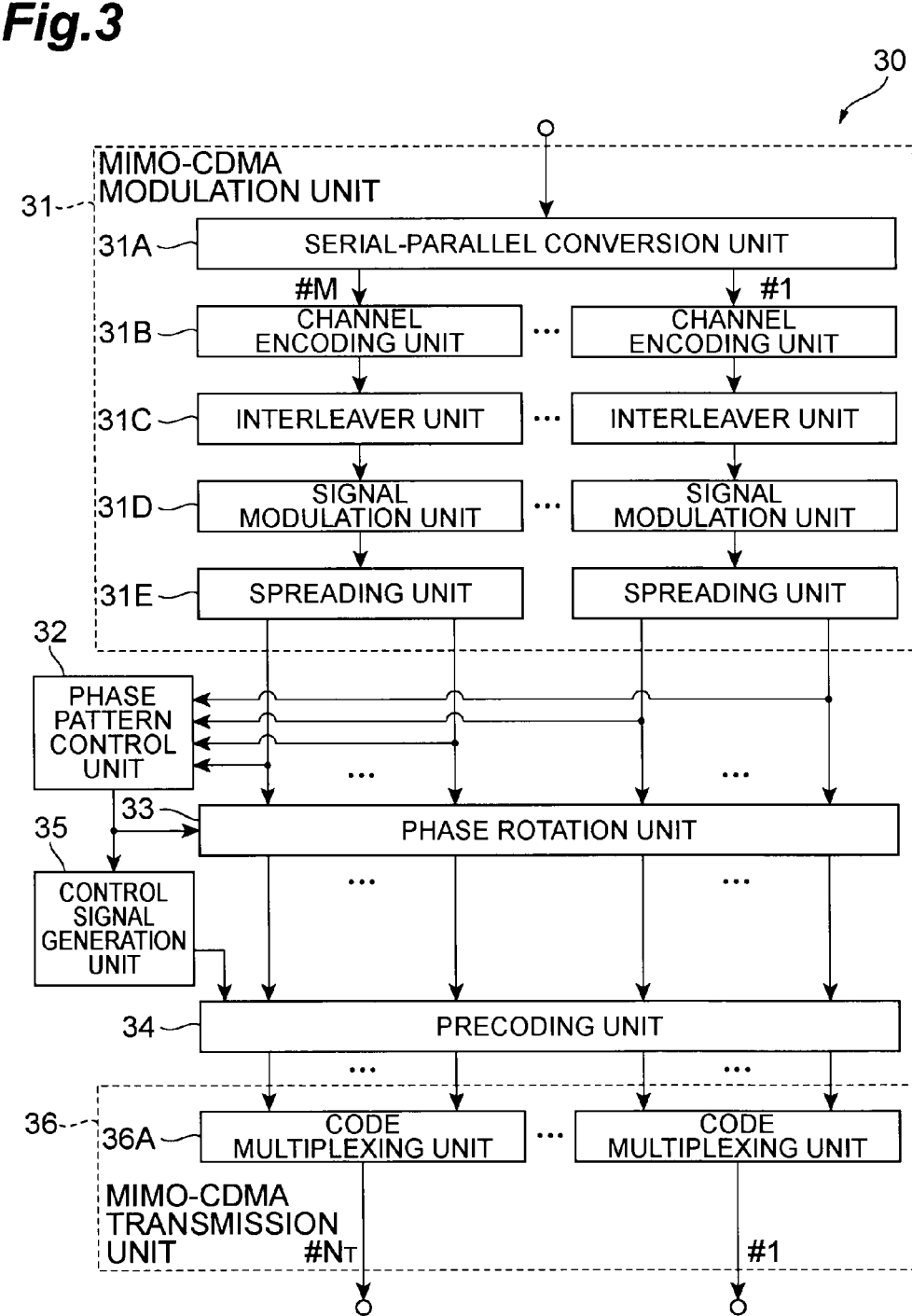
FIG. 3 is a configuration diagram of a wireless transmission device of an MIMO-CDMA transmission system in a first embodiment.

The following provides an explanation of a variation of the configuration of the above-mentioned wireless communication device. Although the previous example indicates a device and method in the case of applying the present invention to an MIMO-OFDM transmission system, the present invention can also be applied to an MIMO-CDMA transmission system. FIG. 3 is a hardware configuration diagram of the present wireless communication device 30 for an MIMO-CDMA transmission system. As shown in FIG. 3, the wireless communication device 30 physically includes an MIMO-CDMA modulation unit 31, a phase pattern control unit 32, a phase rotation unit 33, a precoding unit 34, a control signal generation unit 35, and an MIMO-CDMA transmission unit 36. Here, the MIMO-CDMA modulation unit 31 includes a serial-parallel conversion unit 31A, a channel encoding unit 31B, an interleaver unit 31C, a signal modulation unit 31D and a spreading unit 31E, while the MIMO-CDMA transmission unit 36 includes a code multiplexing unit 36A.

Figure 4:
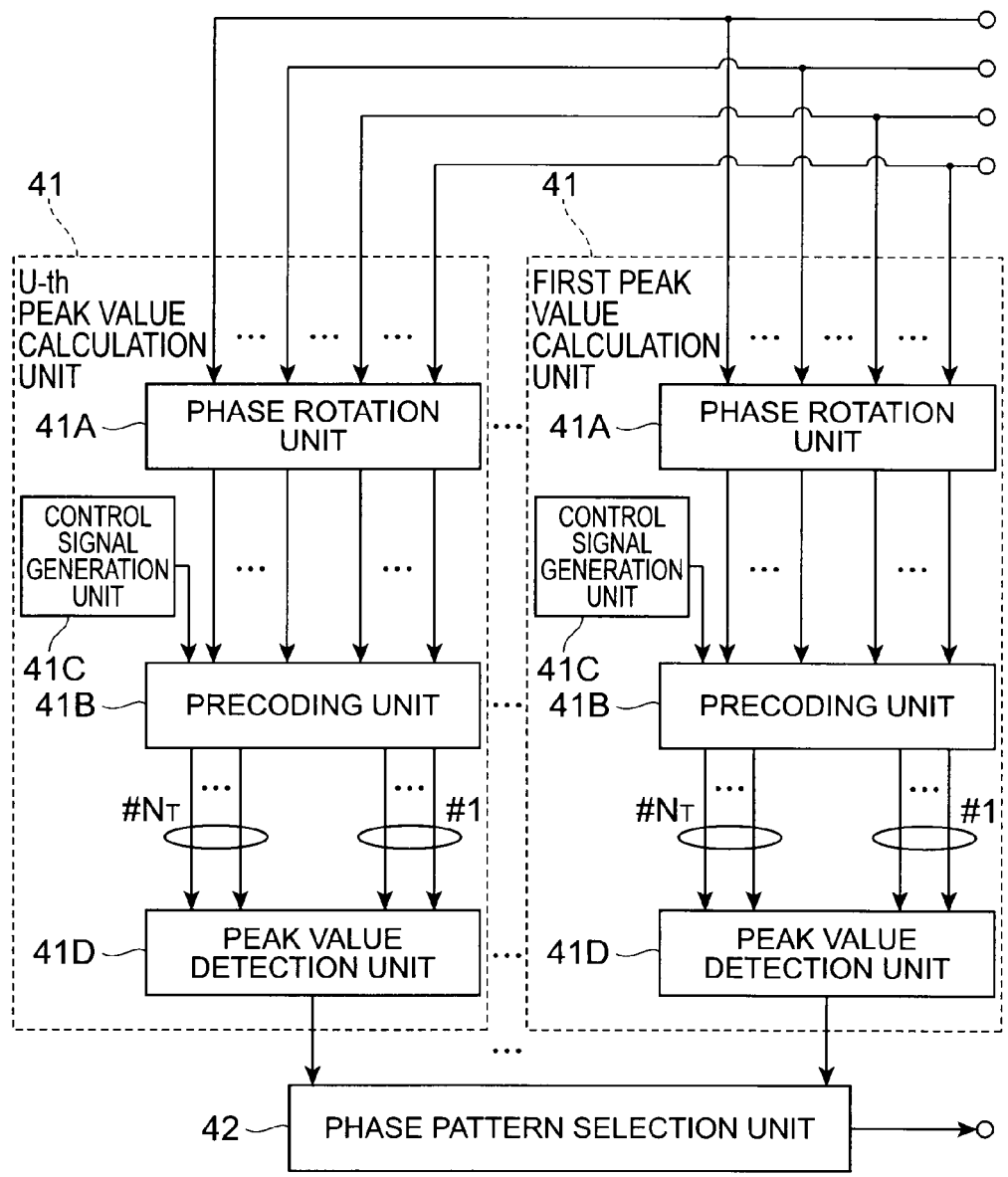
FIG. 4 is a configuration diagram of a phase pattern control unit in a wireless communication device of an MIMO-CDMA transmission system in a first embodiment.

FIG. 4 shows a configuration diagram of the phase pattern control unit 32 for an MIMO-CDMA transmission system in the present embodiment. The phase pattern control unit 32 includes a phase pattern selection unit 42 and U pieces of peak value calculation units 41 ("U" is the number of phase pattern candidates). The peak value calculation unit 41 corresponding to each phase pattern includes a phase rotation unit 41A, a precoding unit 41B, a control signal generation unit 41C and a peak value detection unit 41D.

Continuing, an operation of the wireless communication device 30 and wireless communication method in an MIMO-CDMA transmission system is explained. To begin with, in the MIMO-CDMA modulation unit 31, the serial-parallel conversion unit 31A assigns a data signal to each transmission stream, the channel encoding unit 31B carries out channel encoding, the interleaver unit 31C carries out interleaving, the signal modulation unit 31D carries out modulation, and the spreading unit 31E spreads the modulated signal by using each spreading code (for code multiplexing) to generate a transmission signal.

Continuing, an optimum phase pattern is selected after having reduced PAPR in the phase pattern control unit 32, and a transmission signal generated according to each spreading code is multiplied by the selected phase pattern in the phase rotation unit 33 followed by input to the preceding unit 34. On the other hand, in the control signal generation unit 35, a control signal is generated based on the phase pattern selected in the phase pattern control unit 32, and then input to the preceding unit 34 after spreading a control signal using spreading code. After the preceding unit 34 has carried out preceding processing on the signal input from the phase rotation unit 33 and the signal input from the control signal generation unit 35, the precoded signals are input to the code multiplexing unit 36A of the MIMO-CDMA transmission unit 36. In the code multiplexing unit 36A, a transmission signal is generated in each transmission antenna by carrying out code multiplexing on the input signals. Furthermore, the operation of the phase pattern control unit 32 in an MIMO-CDMA transmission system is the same as the operation of the phase pattern control unit 12 in an MIMO-OFDM transmission system with the exception that there is no inverse Fourier transformation operation in the inverse Fourier transformation unit 21D of the phase pattern control unit 12 (FIG. 2) in an MIMO-OFDM transmission system.

Figure 5:
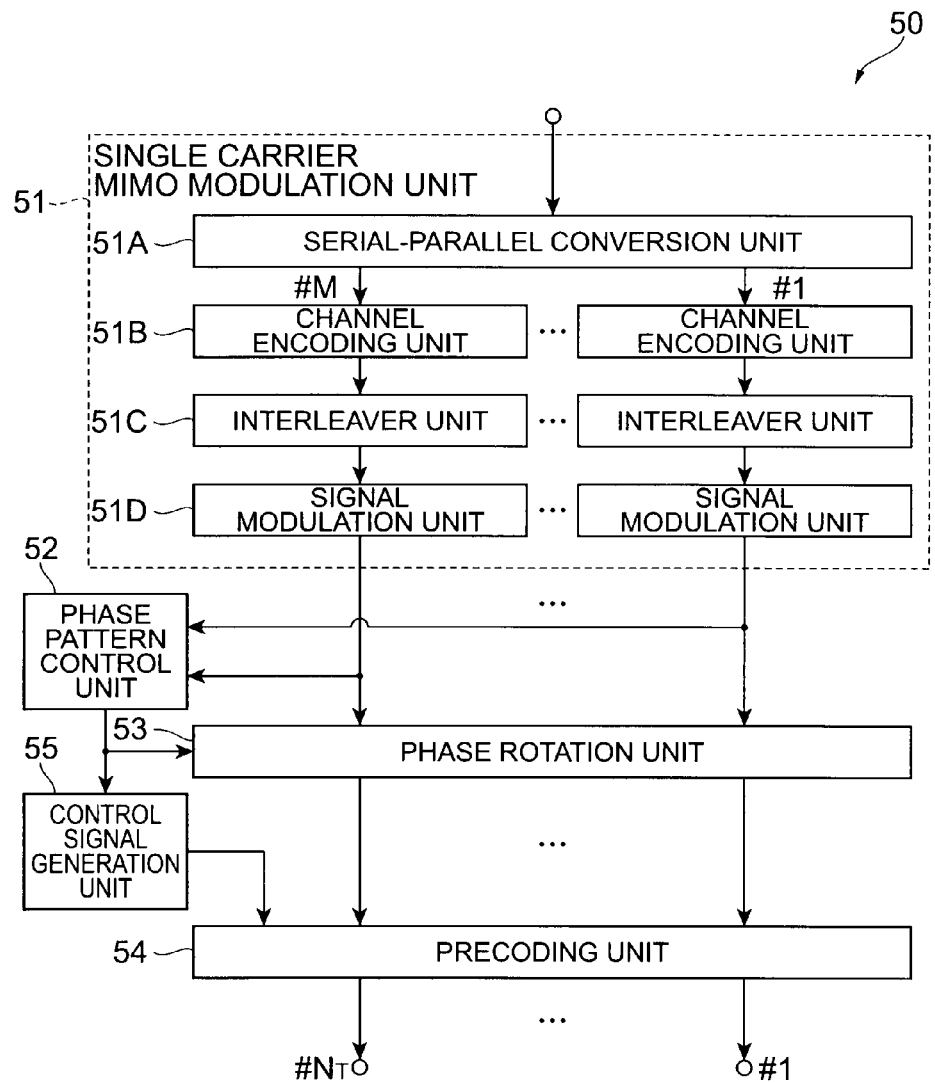
FIG. 5 is a configuration diagram of a wireless communication device of a single carrier MIMO transmission system in a first embodiment.

Although the above explanation has indicated an example of applying a variation of the configuration of a wireless communication device to an MIMO-CDMA transmission system, the following provides an explanation of a different variation in an example of applying to a single carrier MIMO transmission system. FIG. 5 is a hardware configuration diagram of the present wireless communication device 50 for a single carrier MIMO transmission system. As shown in FIG. 5, the wireless communication device 50 physically includes a single carrier MIMO modulation unit 51, a phase pattern control unit 52, a phase rotation unit 53, a precoding unit 54 and a control signal generation unit 55. Here, the single carrier MIMO modulation unit 51 includes a serial-parallel conversion unit 51A, a channel encoding unit 51B, an interleaver unit 51C and a signal modulation unit 51D.

Figure 6:
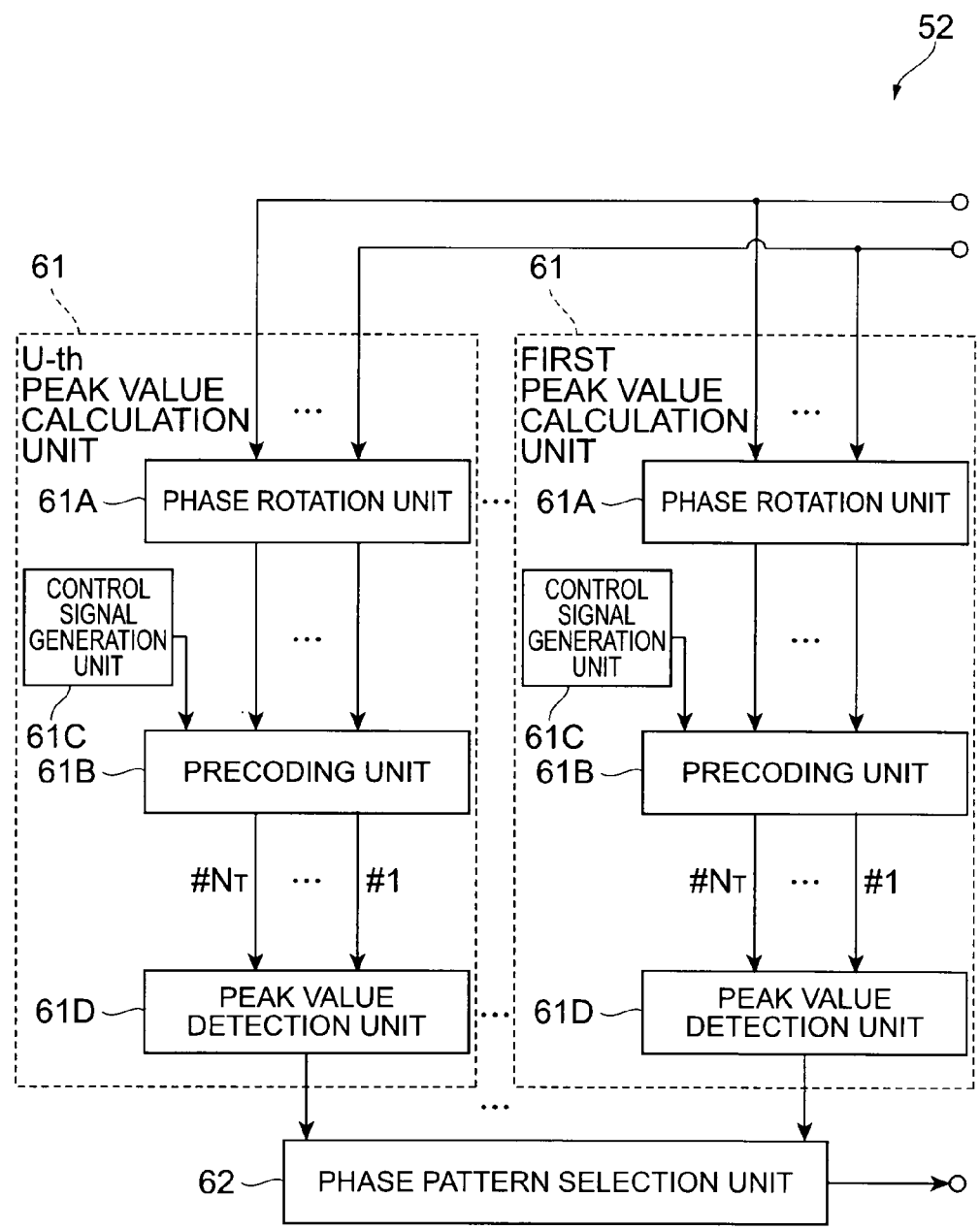
FIG. 6 is a configuration diagram of a phase pattern control unit in a wireless communication device of a single carrier MIMO transmission system in a first embodiment.

FIG. 6 shows a configuration diagram of the phase pattern control unit 52 for a single carrier MIMO transmission system in the present embodiment. The phase pattern control unit 52 includes a phase pattern selection unit 62 and U pieces of peak value calculation units 61 ("U" is the number of phase pattern candidates). The peak value calculation unit 61 corresponding to each phase pattern includes a phase rotation unit 61A, a precoding unit 61B, a control signal generation unit 61C and a peak value detection unit 61D.

Continuing, an operation of the wireless communication device 50 and a wireless communication method in a single carrier MIMO transmission system is explained. To begin with, in the single carrier MIMO transmission unit 51, the serial-parallel conversion unit 51A assigns a data signal to each transmission stream to be multiplexed, the channel encoding unit 51B carries out channel encoding, the interleaver unit 51C carries out interleaving, the signal modulation unit 51D carries out modulation to generate a transmission signal. Continuing, the phase pattern control unit 52 selects an optimum phase pattern in terms of reducing PAPR, and the phase rotation unit 53 multiplies the transmission signal by the selected phase pattern on the basis thereof, followed by input to the precoding unit 54. On the other hand, the control signal generation unit 55 generates a control signal based on the phase pattern selected by phase pattern control unit 52, followed by input to precoding unit 54. After the precoding unit 54 carries out precoding processing on the signal input from the phase rotation unit 53 and on the signal input from the control signal generation unit 55, the precoded signal is transmitted by each transmission antenna.

Here, although the above explanation indicates the example of the case of the signals output from the phase rotation unit 53 and the control signal generation unit 55 being spatially multiplexed in the preceding unit 54, the signals output from the phase rotation unit 53 and the control signal generation unit 55 may also be time-multiplexed.

Furthermore, the operation of the phase pattern control unit 52 in single carrier MIMO transmission systems is the same as the operation of the phase pattern control unit 12 in an MIMO-OFDM transmission system with the exception that there is no inverse Fourier transformation operation in the inverse Fourier transformation unit 21D of the phase pattern control unit 12 (FIG. 2) in an MIMO-OFDM transmission system.

Continuing, a variation of the peak value detection units 21E, 41D and 61D of the present embodiment is explained. In the peak value detection units 21E, 41D and 61D as described above, although a configuration in which the maximum value of signal power of a time signal waveform is output as a peak value is explained, a configuration may also be employed that calculates total power equal to or greater than a threshold power clipped in the peak value detection units 21E, 41D and 61D in consideration of clipping with a transmission power amplifier. At this time, an optimum phase pattern which minimizes the total power equal to or greater than the clipped threshold power is selected in the phase pattern selection units 22, 42 and 62.

Furthermore, although the previous explanation of the present embodiment indicates a device and method in the case of using eigenmode transmission for linear precoding processing, PAPR can also be reduced while retaining effects of linear precoding by using the method described above in the case of using other transmission precoding methods.

[Second Embodiment]

Figure 7:
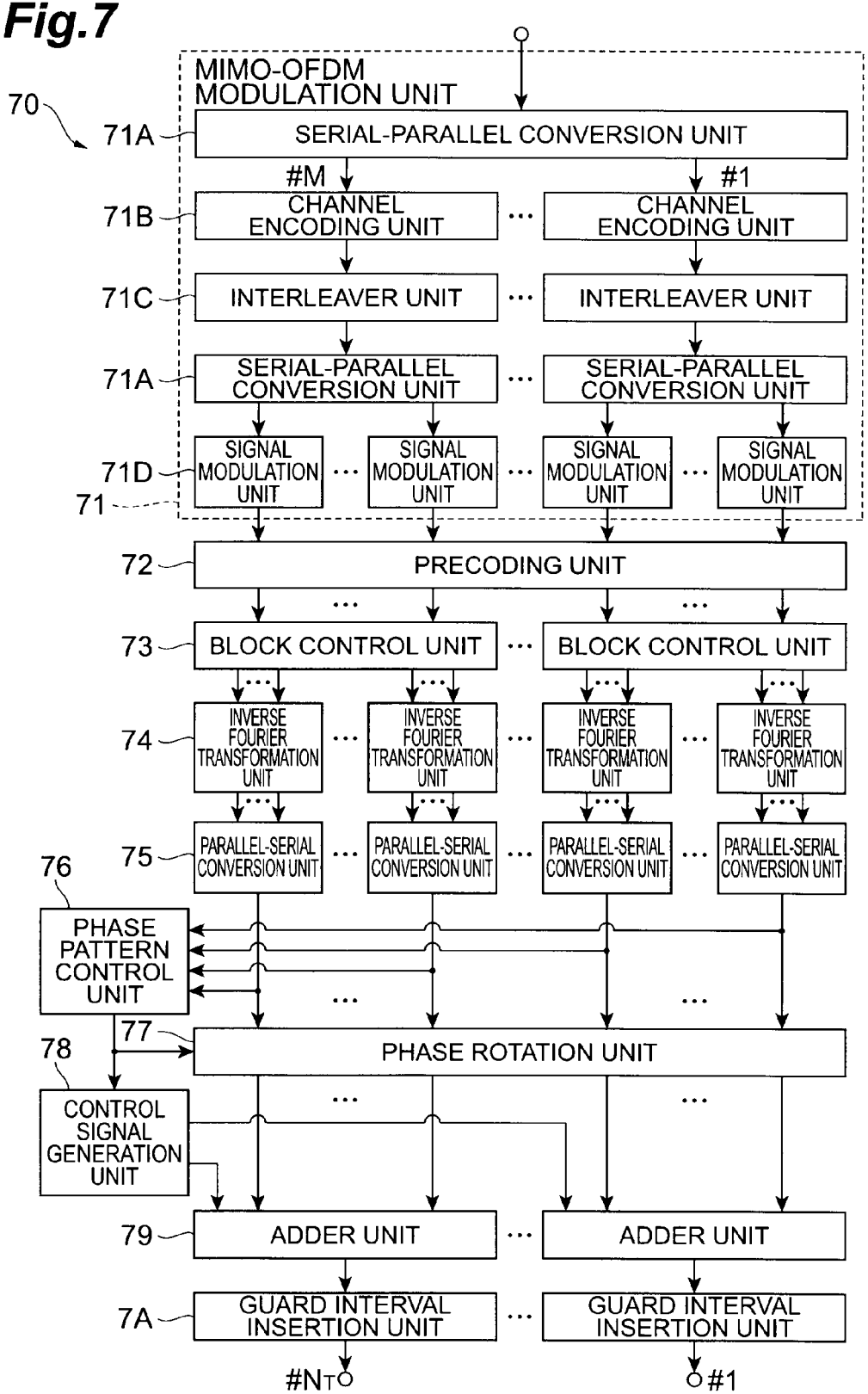
FIG. 7 is a configuration diagram of a wireless communication device in a second embodiment.

Continuing, the following provides an explanation of the configuration of a wireless communication device in a second embodiment of the present invention. Since the wireless communication device in the present embodiment is able to reduce the number of inverse Fourier transformation units in the phase pattern control unit in comparison with the wireless communication device for an MIMO-OFDM transmission system in the first embodiment, the load of operations in the phase pattern control unit can be reduced. FIG. 7 is a hardware configuration diagram of the present wireless communication device 70. The wireless communication device 70 in the present embodiment includes an MIMO-OFDM modulation unit 71, a precoding unit 72, a block control unit 73, an inverse Fourier transformation unit 74, a parallel-serial conversion unit 75, a phase pattern control unit 76, a phase rotation unit 77, a control signal generation unit 78, an adder unit 79 and a guard interval insertion unit 7A. Here, the MIMO-OFDM modulation unit 71 has the same configuration as in the first embodiment.

Figure 8:
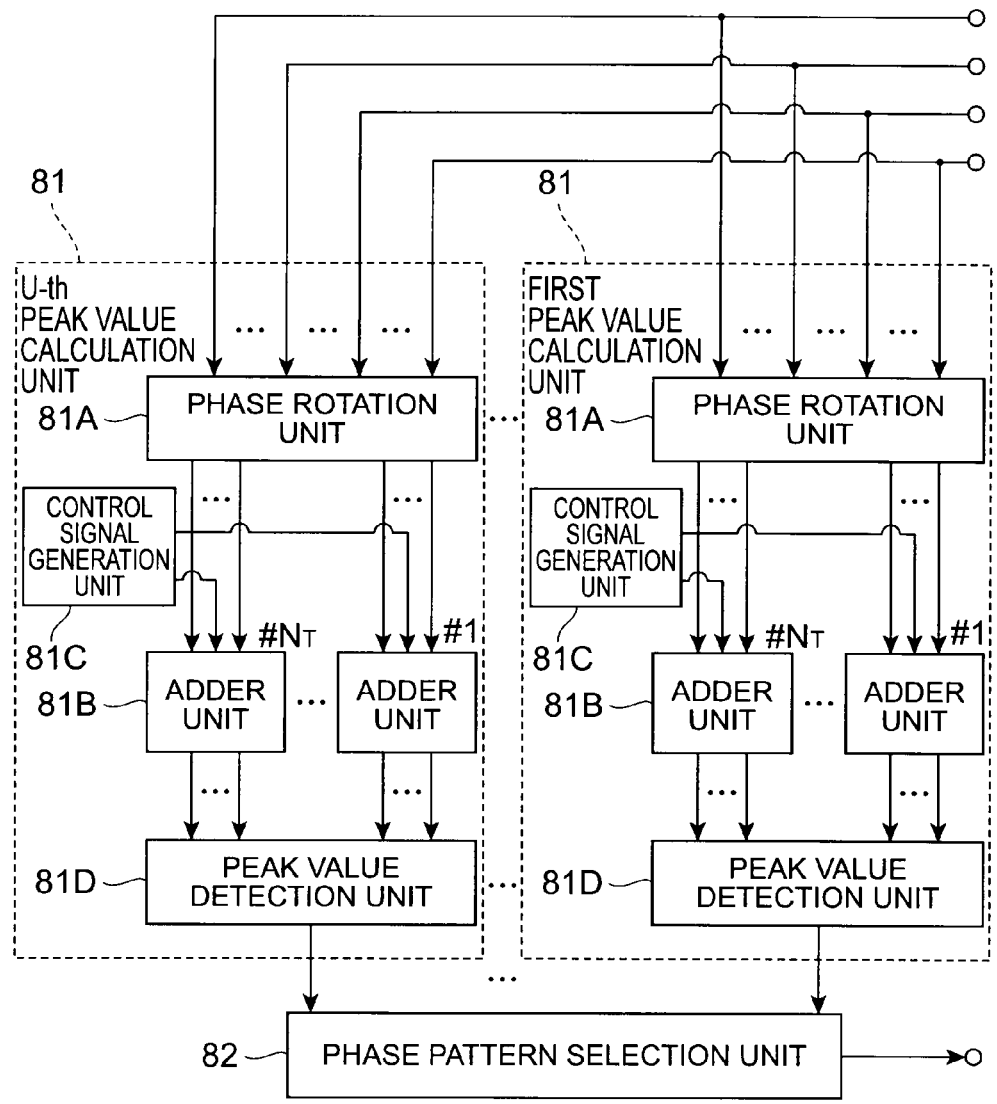
FIG. 8 is a configuration diagram of a phase pattern control unit of a wireless communication device in a second embodiment.

FIG. 8 shows a configuration diagram of the phase pattern control unit 76 of the present embodiment. The phase pattern control unit 76 includes a phase pattern selection unit 82 and U pieces of peak value calculation units 81 ("U" is the number of phase pattern candidates). The peak value calculation unit 81 corresponding to each phase pattern includes a phase rotation unit 81A, an adder unit 81B, a control signal generation unit 81C and a peak value detection unit 81D.

Continuing, an operation of the wireless communication device 70 and a wireless communication method in the present embodiment is explained. The signal generation method in the MIMO-OFDM modulation unit 71 of the present embodiment is the same as that of the first embodiment. Differing from the first embodiment, a unitary matrix $V_n$ is first multiplied by a transmission signal $z_n$ generated by the MIMO-OFDM modulation unit 71 in the precoding unit 72 in the present embodiment. The signal output from the preceding unit 72 is divided into a plurality of blocks in the block control unit 73, and converted to a time signal waveform in the inverse Fourier transformation unit 74 for each block. Signals output from the inverse Fourier transformation unit 74 are converted to a serial time signal series in the parallel-serial conversion unit 75. Signals output from the parallel-serial conversion unit 75 are input to the phase pattern control unit 76 to be described later, and an optimum phase pattern in terms of reducing PAPR is selected. Phase pattern data selected in the phase pattern control unit 76 is input to the phase rotation unit 77 and the control signal generation unit 78. In the phase rotation unit 77, phase rotation is carried out on the signals input from the parallel-serial conversion unit 75 by using the phase pattern data input from the phase pattern control unit 76, and the phase-rotated signals are input to the adder unit 79. On the other hand, the control signal generation unit 78 generates a control signal for notifying phase pattern data to the receiving side by using the phase pattern data input from the phase pattern control unit 76, and the generated control signal is input to the adder unit 79 corresponding to each transmission antenna. Here, with respect to generation of the control signal in the control signal generation unit 78, a time signal waveform corresponding to each phase pattern candidate is stored in memory in advance, and the time signal waveform corresponding to the selected phase pattern can be output in the form of a control signal. In addition, the control signal corresponding to the phase pattern selected with the phase pattern control unit 76 is generated in a frequency domain, and a time signal waveform resulting from inverse Fourier transformation of the generated signal can also be used as an output signal from the control signal generation unit 78.

In the adder unit 79, signals from the plurality of blocks output from the phase rotation unit 77 and the control signal are added, and the added signal is input to the guard interval insertion unit 7A. In the guard interval insertion unit 7A, a guard interval is inserted into the signal input from the adder unit 79 to generate a transmission signal in each antenna.

Continuing, an operation of the phase pattern control unit 76 shown in FIG. 8 is explained. In the phase pattern control unit 76 including the phase pattern selection unit 82 and U pieces of peak value calculation units 81 ("U" is the number of phase pattern candidates), the peak value calculation unit 81 corresponding to the u-th ($1 \leq u \leq U$) phase pattern carries out phase rotation in the phase rotation unit 81A by multiplying a matrix $Q'_{u,n}$ defined by the following formula in the phase rotation by a signal input from the parallel-serial conversion unit 75.

$$Q'_{u,n} = \begin{pmatrix} e^{j\phi_{u,n}} & 0 & \ldots & 0 \\ 0 & e^{j\phi_{u,n}} & \ldots & 0 \\ \vdots & \vdots & \ddots & \vdots \\ 0 & 0 & \ldots & e^{j\phi_{u,n}} \end{pmatrix} \quad (11)$$

Here, as shown in formula (11), differing from the case of the first embodiment indicated by formula (5), the present embodiment is characterized by imparting the same amount of phase rotation to each beam formed.

On the other hand, in the control signal generation unit 81C, a control signal is generated corresponding to the u-th ($1 \leq u \leq U$) phase pattern. Here, with respect to the generation of the control signal in the control signal generation unit 81C, a control signal can be generated either by storing a time signal waveform of the control signal corresponding to the phase pattern in memory in advance, or by carrying out inverse Fourier transformation after a control signal corresponding to the phase pattern has been generated in a frequency domain as previously described. The control signal output from the control signal generation unit 81C and the signal output from the phase rotation unit 81A are input to the adder unit 81B resulting in the generation of a time signal waveform following addition thereof. The signal output from the adder unit 81B is input to the peak value detection unit 81D and in the peak value detection unit 81D, the time signal waveforms corresponding to each transmission antenna are compared and the maximum peak value is output. The peak value output from the peak value detection unit 81D of each peak value calculation unit 81 is input to the phase pattern selection unit 82. In the phase pattern selection unit 82, a phase pattern is selected that enables the input maximum peak value to be reduced the most, after which the selected phase pattern û' is output. The selected phase pattern û' is input to the phase rotation unit 77 and the control signal generation unit 78 in FIG. 7.

Continuing, an action and effects of the wireless communication device 70 in the present embodiment is explained. In the wireless communication device 70 in the present embodiment, phase rotation is carried out by using a matrix defined by formula (11). As a result, the transmission signal vector $s_{u,n}$ represented in the form of formula (6) in the first embodiment is represented by the following formula in the present embodiment.

$$s_{u,n} = Q_{u,n} V_n z_n = e^{j\phi_{u,n}} V_n z_n = e^{j\phi_{u,n}} s_n \quad (12)$$

Here, $s_n$ is a signal output from the precoding unit 72 and is such that $s_n = V_n z_n$.

In the block control unit 73, the same amount of phase rotation is imparted by dividing so that a signal of a subcarrier number $\{b, B+b, \ldots (N/B-1)B+b\}$ belongs to a b-th ($0 \leq b \leq B-1$) block, and defining the amount of phase rotation $\phi_{u,n}$ in each subcarrier within the same block as $\phi_{u,n} = \phi_{u,B+b} = \ldots \phi_{u,(N/B-1)B+b}$. At this time, the time signal waveform $s_{u,n_t}(k)$ in the $n_t$-th transmission antenna in the transmission signal vector $s_{u,n}$ can be represented with the following formulas.

$$s_{u,n_t}(k) = \quad (13)$$

$$\frac{1}{\sqrt{N}} \sum_{n=0}^{N-1} e^{j\phi_{u,n}} s_{n_t,n} e^{j2\pi \frac{n}{N}k} = \frac{1}{\sqrt{N}} e^{j\phi_{u,0}} \sum_{n_b=0}^{N/B-1} s_{n_t,n_b B} e^{j2\pi \frac{n_b B}{N}k} +$$

$$\frac{1}{\sqrt{N}} e^{j\phi_{u,1}} \sum_{n_b=0}^{N/B-1} s_{n_t,n_b B+1} e^{j2\pi \frac{(n_b B+1)}{N}k} + \ldots +$$

$$\frac{1}{\sqrt{N}} e^{j\phi_{u,B-1}} \sum_{n_b=0}^{N/B-1} s_{n_t,n_b B+B-1} e^{j2\pi \frac{(n_b B+B-1)}{N}k} =$$

$$\frac{1}{\sqrt{N}} \sum_{b=0}^{B-1} e^{j\phi_{u,b}} \sum_{n_b=0}^{N/B-1} s_{n_t,n_b B+b} e^{j2\pi \frac{(n_b B+b)}{N}k}$$

Here, $$\sum_{n_b=0}^{N/B-1} s_{n_t,n_b B+b} e^{j2\pi \frac{(n_b B+b)}{N}k}$$

in the formula (13) includes a modulation signal of the subcarrier belonging to the b-th block. The signal series of length N represented by the following formula (14) becomes a time signal waveform resulting from inverse Fourier transformation.

$$[0, \ldots, 0, s_{n_t,b}, 0, \ldots, 0, s_{n_t,B+b}, \ldots s_{n_t,(N/B-1)B+b}, 0, \ldots, 0] \quad (14)$$

Thus, in formula (13), a signal divided into each block is multiplied by a time signal waveform $e^{j\phi_{u,b}}$ that has undergone inverse Fourier transformation resulting in a waveform that is the combined sum of all blocks. As a result, phase rotation is able to be carried out in the phase control unit 77 in FIG. 7 and the phase control unit 81A in FIG. 8 on a signal divided into each block in the block control unit 73 that has undergone inverse Fourier transformation. As a result, since the inverse Fourier transformation unit 21D used in the peak value calculation units 21 of the first embodiment shown in FIG. 2 can be omitted from each of the peak value calculation units 81 in the phase pattern control unit 76 shown in FIG. 8, the load of operations can be reduced. In other words, in the present embodiment, as a result of dividing the signal of each subcarrier in the form shown in formula (14) in the block control unit 73, and imparting an equal amount of phase rotation for each subcarrier within the same block, PAPR can be reduced while retaining effects of linear precoding in an MIMO-OFDM system while also reducing the load of operations in the phase pattern control unit 76.

Moreover, a following formula (15) can be derived from the formula (13) by assuming $N_B = N/B$.

$$\frac{1}{\sqrt{N}} \sum_{b=0}^{B-1} e^{j\phi_{u,b}} \sum_{n_b=0}^{N_B-1} s_{n_t,n_b B+b} e^{j2\pi \frac{(n_b B+b)}{N}k} = \quad (15)$$

$$\frac{1}{\sqrt{N}} \sum_{b=0}^{B-1} e^{j\phi_{u,b}} e^{j2\pi \frac{b}{N}k} \sum_{n_b=0}^{N_B-1} s_{n_t,n_b B+b} e^{j2\pi \frac{n_b}{N_B}k} =$$

$$\sqrt{\frac{N_B}{N}} \sum_{b=0}^{B-1} e^{j\phi_{u,b}} e^{j2\pi \frac{b}{N}k} s_{b,n_t}(k \bmod N_B)$$

Here, $s_{b,n_t}(k')$ ($0 \leq k' \leq N_B - 1$) is a time signal waveform resulting from inverse Fourier transformation of the signal series of length $N_B$ represented by the following formula (16).

$$[s_{n_t,b}, s_{n_t,B+b}, \ldots s_{n_t,(N/B-1)B+b}] \quad (16)$$

Thus, the number of points in inverse Fourier transformation can be reduced from N to $N_B$. As a result, the load of operations for inverse Fourier transformation by the inverse Fourier transformation unit 74 in FIG. 7 can be further reduced. In other words, by generating the signal series indicated by formula (16) for each block in the block control unit 73 of FIG. 7, and making the number of points in inverse Fourier transformation by the inverse Fourier transformation unit 74 $N_B$, PAPR can be reduced while retaining effects of linear precoding in an MIMO-OFDM system while also reducing the load of operations of inverse Fourier transformation.

Furthermore, although the preceding explanation of the present embodiment indicates the example of applying to an MIMO-OFDM transmission system, the present invention can also be applied to any systems based on OFDM, such as a Multi Carrier (MC)-CDMA or OFDMA system in the same manner as in the case of the first embodiment. Here, in the case of applying the present invention to OFDMA, the amount of data to be transmitted as a control signal can be reduced or the control signal generation unit 78 can be omitted by assigning a signal of each block divided in the block control unit 73 to different users. This is because, since the same amount of phase rotation is applied within the same block in the present embodiment, all subcarriers transmitted to each user are subjected to the same effect of phase rotation.

In addition, although the preceding explanation of the present embodiment explains the case of the peak value detection unit 81D outputting a maximum peak value, it may also be configured to output total power equal to or greater than a clipped threshold value as explained in a variation of the peak value detection unit of the first embodiment.

The following provides an explanation of an example in the first embodiment of the present invention with reference to the drawings. The results of a computer simulation in the case of applying the first embodiment of the present invention to an MIMO-OFDM system using eigenmode transmission for linear precoding are shown below in order to confirm the efficacy of the present invention. The number of transmission and reception antennas is two each, and two streams are spatially multiplexed. In addition, OFDM parameters are made to comply with a 5 GHz-band wireless LAN, and the number of FFT points is 64. QPSK is used for the modulation method, and the number phase patterns U in the present invention is 16.

Figure 9:
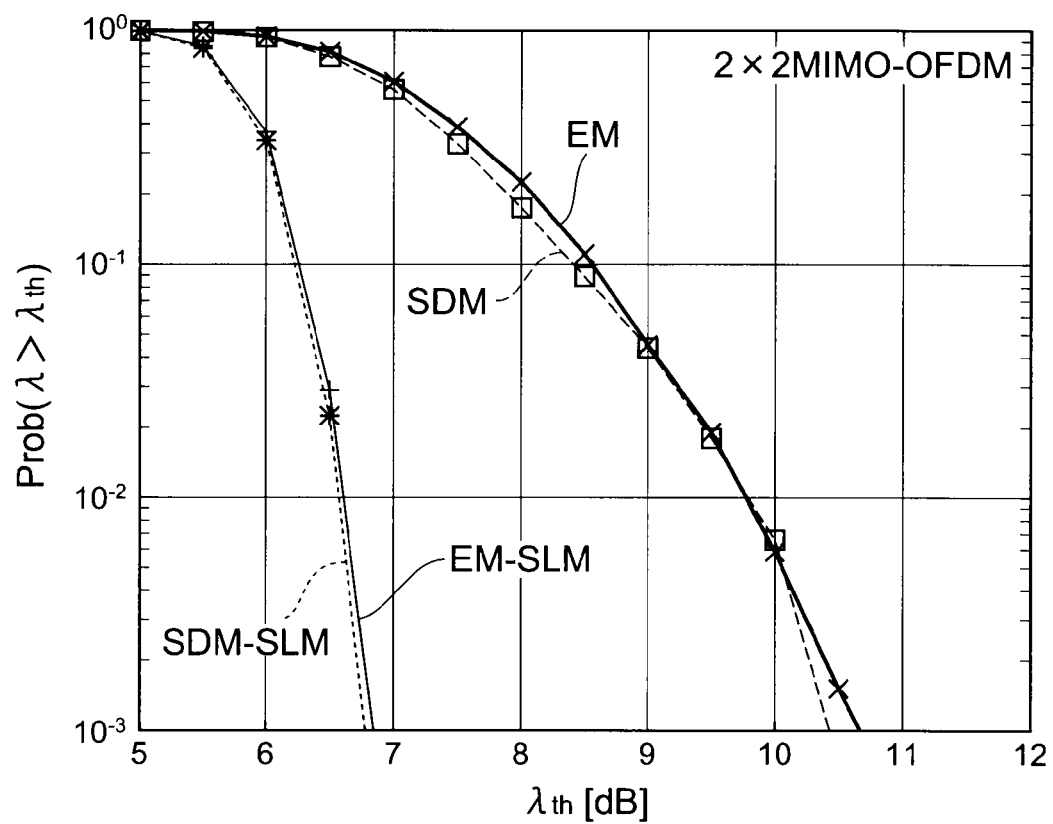
FIG. 9 is a drawing showing PAPR characteristics demonstrating effects of applying the present invention.

The Complementary Cumulative Distribution Function (CCDF) characteristics of PAPR in the present invention and the conventional eigenmode transmission are shown in FIG. 9. In addition, for the sake of comparison, CCDF characteristics in the case of not carrying out eigenmode transmission are also shown. In this FIG. 9, EM represents CCDF characteristics of conventional eigenmode transmission, while EM-SLM represents CCDF characteristics of eigenmode transmission applying the first embodiment of the present invention. In addition, SDM represents CCDF characteristics of an MIMO-OFDM system not carrying out eigenmode transmission, while SDM-SLM represents CCDF characteristics in the case of applying the method of the Document 1 in an MIMO-OFDM system not carrying out eigenmode transmission.

According to FIG. 9, EM and SDM, in which PAPR reduction processing is not used, demonstrates roughly equal CCDF characteristics, while CCDF characteristics of EM-SLM in which U=16 applying the first embodiment of the present invention are found to enable a reduction in PAPR of about 3.6 dB at CCDF=$10^{-3}$ with respect to CCDF characteristics of EM. In addition, EM-SLM is found to be able to realize PAPR characteristics roughly equal to those of SDM-SLM in which eigenmode transmission is not used.

The disclosure of Japanese Patent Application No. 2008-034935 filed on Feb. 15, 2008 including specification, drawings and claims is incorporated herein by reference in its entirety.

What is claimed is:

1. A wireless communication device that transmits a wireless signal by performing linear precoding processing using a plurality of transmission antennas, comprising:
    a phase pattern control unit configured to select a phase pattern that reduces a peak-to-average power ratio;
    a phase rotation unit configured to perform phase rotation on a modulation signal using the phase pattern selected by the phase pattern control unit;
    a control signal generation unit configured to generate a control signal based on the phase pattern selected by the phase pattern control unit; and
    a precoding unit configured to perform linear precoding processing on output signals from the phase rotation unit and output signals from the control signal generation unit,
    wherein the phase pattern control unit includes:
        a plurality of peak value calculation units, each configured to perform phase rotation on the modulation signal corresponding to a respective pre-determined phase pattern; and
        a phase pattern selection unit configured to select a phase pattern based on outputs of the plurality of peak value calculation units.

2. The wireless communication device according to claim 1,
    wherein the wireless communication device further comprises an MIMO-OFDM modulation unit and an MIMO-OFDM transmission unit, and the wireless communication device is configured so that:
    a signal of each subcarrier generated by the MIMO-OFDM modulation unit is input to the phase rotation unit and the phase pattern control unit, and
    the output from the precoding unit is input to the MIMO-OFDM transmission unit.

3. The wireless communication device according to claim 1,
    wherein the wireless communication device further comprises an MIMO-CDMA modulation unit and an MIMO-CDMA transmission unit, and the wireless communication device is configured so that:
    a spread signal generated by using each spreading code by the MIMO-CDMA modulation unit is input to the phase rotation unit and the phase pattern control unit, and
    the output from the precoding unit is input to the MIMO-CDMA transmission unit.

4. The wireless communication device according to claim 1,
    wherein the wireless communication device further comprises a single carrier MIMO modulation unit, and the wireless communication is configured so that a signal of each transmission stream generated in order to perform parallel transmission in the single carrier MIMO modulation unit is input to the phase rotation unit and the phase pattern control unit.

5. A wireless communication device that transmits a wireless signal by performing linear precoding processing using a plurality of transmission antennas, comprising:
    an MIMO-OFDM modulation unit;
    a precoding unit configured to perform linear precoding processing on a signal of each subcarrier generated by the MIMO-OFDM modulation unit;
    a block control unit into which the output from the precoding unit is input;
    an inverse Fourier transformation unit into which a signal divided into a plurality of blocks by the block control unit is input;
    a parallel-serial conversion unit into which the output from the Fourier transformation unit is input;
    a phase pattern control unit configured to select a phase pattern that reduces a peak-to-average power ratio, by using a time signal waveform that is output from the parallel-serial conversion unit;
    a phase rotation unit configured to perform phase rotation on a signal input from the parallel-serial conversion unit, using the phase pattern selected by the phase pattern control unit; and
    a control signal generation unit configured to generate a control signal based on the phase pattern selected by the phase pattern control unit.

6. A wireless communication method for transmitting a wireless signal by performing linear precoding processing using a plurality of transmission antennas, the method comprising:
    a phase pattern control step of selecting a phase pattern that reduces a peak-to-average power ratio;
    a phase rotation step of performing phase rotation on a modulation signal using the phase pattern selected in the phase pattern control step;
    a control signal generation step of generating a control signal based on the phase pattern selected in the phase pattern control step; and
    a precoding step of performing linear precoding processing on output signals generated in the phase rotation step and output signals generated in the control signal generation step,
    wherein the phase pattern control step includes:
        a plurality of peak value calculation steps, each performing phase rotation on the modulation signal corresponding to a respective pre-determined phase pattern; and
        a phase pattern selection step of selecting a phase pattern based on outputs of the plurality of peak value calculation steps.

7. The wireless communication method according to claim 6,
    wherein the wireless communication method further comprises an MIMO-OFDM modulation step and an MIMO-OFDM transmission step, and the wireless communication method includes:
    using a signal of each subcarrier generated in the MIMO-OFDM modulation step in the phase rotation step and the phase pattern control step, and
    using the output from the precoding step in the MIMO-OFDM transmission step.

8. The wireless communication method according to claim 6,
    wherein the wireless communication method further comprises an MIMO-CDMA modulation step and an MIMO-CDMA transmission step, and the wireless communication method includes:

using a spread signal generated by using each spreading code in the MIMO-CDMA modulation step in the phase rotation step and the phase pattern control step, and using the output from the precoding step in the MIMO-CDMA transmission step.

9. The wireless communication method according to claim 6, wherein the wireless communication method further comprises a single carrier MIMO modulation step, and the wireless communication method includes:

using a signal of each transmission stream generated in order to perform parallel transmission in the single carrier MIMO modulation step in the phase rotation step and the phase pattern control step.

10. A wireless communication method for transmitting a wireless signal by performing linear precoding processing using a plurality of transmission antennas, the method comprising:

an MIMO-OFDM modulation step of generating a signal for each of plural subcarriers;

a precoding step of performing linear precoding processing on the signal of each subcarrier generated in the MIMO-OFDM modulation step;

a block control step of inputting an output generated in the precoding step;

an inverse Fourier transformation step of inputting a signal divided into a plurality of blocks in the block control step;

a parallel-serial conversion step of inputting an output generated in the inverse Fourier transformation step;

a phase pattern control step of selecting a phase pattern that reduces a peak-to-average power ratio, using a time signal waveform that is output in the parallel-serial conversion step;

performing phase rotation on a signal input in the parallel-serial conversion step, using the phase pattern selected in the phase pattern control step; and generating a control signal based on the phase pattern selected in the phase pattern control step.

* * * * *